Nov. 27, 1923.                                           1,475,879
J. S. REYNOLDS
EARTHWORKING MACHINE
Filed Nov. 16, 1920
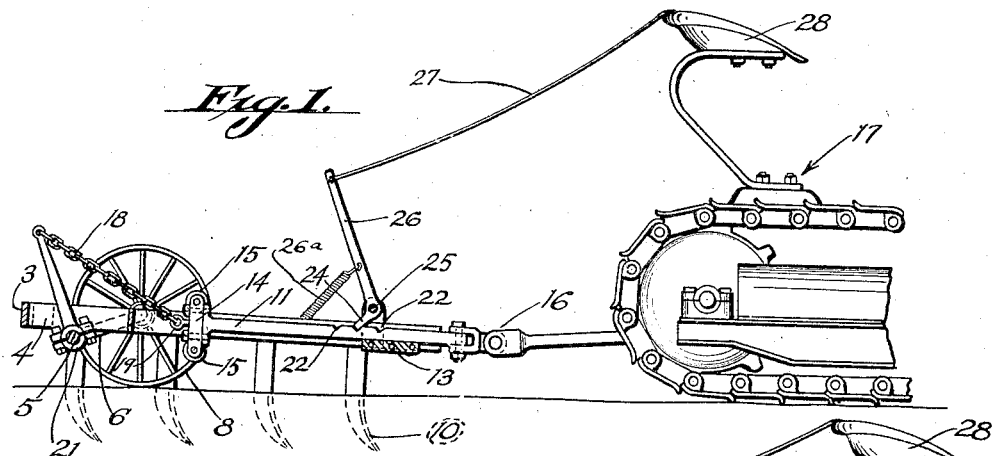
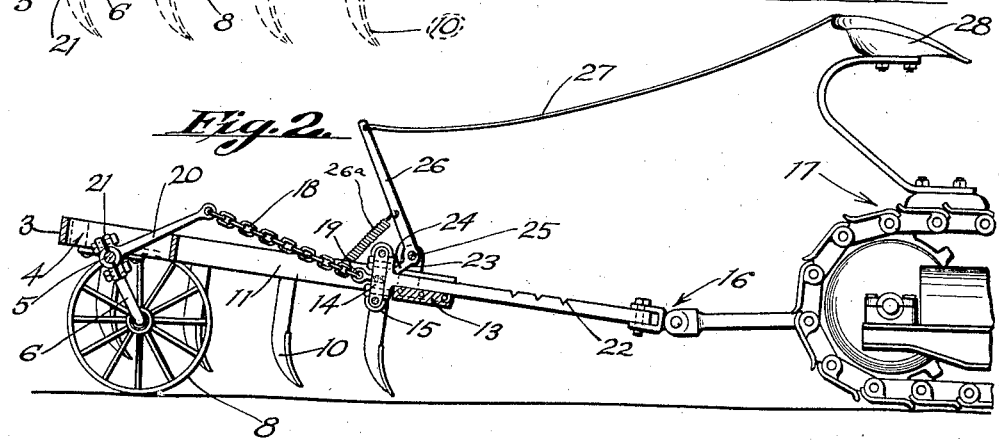
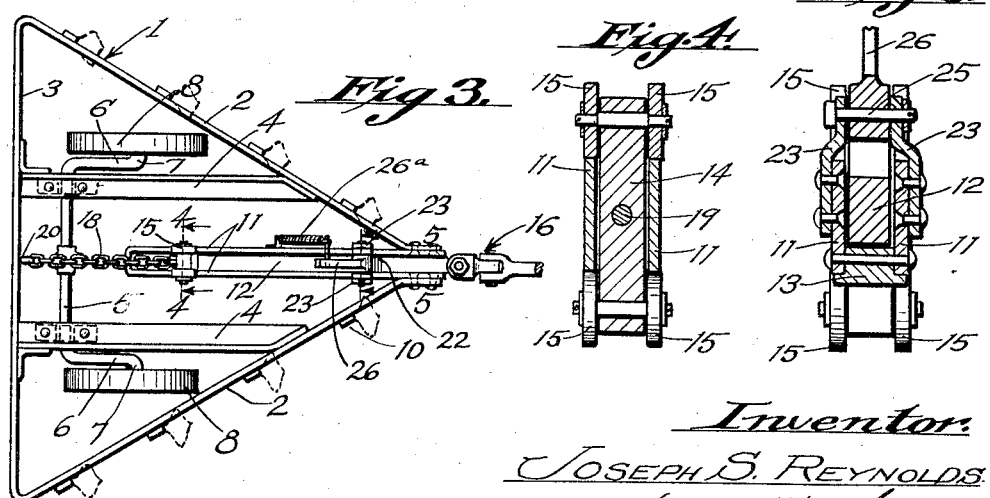
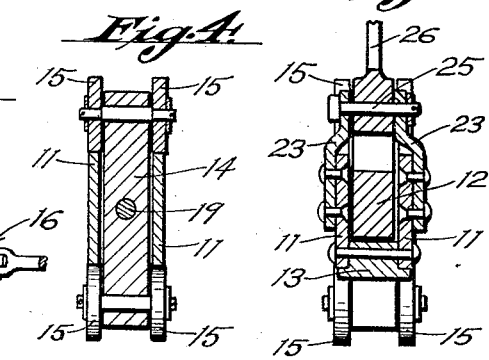
Inventor:
JOSEPH S. REYNOLDS
Hazard & Miller
Attorneys.

Patented Nov. 27, 1923.

1,475,879

UNITED STATES PATENT OFFICE.

JOSEPH S. REYNOLDS, OF CARPINTERIA, CALIFORNIA.

EARTHWORKING MACHINE.

Application filed November 16, 1920. Serial No. 424,381.

*To all whom it may concern:*

Be it known that I, JOSEPH S. REYNOLDS, a citizen of the United States, residing at Carpinteria, in the county of Santa Barbara and State of California, have invented new and useful Improvements in Earthworking Machines, of which the following is a specification.

It is the object of this invention to provide an earth working machine which consists of a wheeled frame having the earth working elements depending from the frame so as to engage the ground, and also having means whereby the frame may be elevated through the draft upon the vehicle in order to raise the earth engaging elements from the ground. The invention also provides means whereby the elevation of the frame may be readily controlled from the driver's seat of the tractor or the like employed for pulling the machine. The invention also provides a construction wherein the frame may be readily lowered after elevation thereof so as to cause the earth engaging elements to again enter the earth by backing up the machine.

The invention will be readily understood from the following description of the accompanying drawings, in which:

Figure 1 is a longitudinal section through a machine constructed in accordance with the invention showing the earth engaging elements in operative position.

Fig. 2 is a similar view showing the frame of the machine elevated from the ground.

Fig. 3 is a plan view of the machine in operative position.

Figs. 4 and 5 are detail sections on the lines 4—4 and 5—5 of Fig. 3.

The frame of the machine is shown at 1 as substantially triangular in plan although it will be obvious that a frame of other shape may be employed. The side bars 2 of this triangular frame are connected by the rear bar 3 and support a draft mechanism between said side bars at their meeting ends and extending toward the rear cross bar 3. Bars 4 extend parallel to the direction of draft at either side of the draft mechanism, and are preferably connected at their front ends to side bars 2 and at their rear ends to cross bar 3.

An axle 5 is journaled in bars 4 adjacent the rear ends of the same, and beyond said bars the axle is provided with crank throws 6 terminating in stub axles 7 having the wheels 8 mounted thereon. The machine is supported by wheels 8 engaging the ground, and by rotating axle 5 in bars 4, the frame of the machine may be elevated and lowered with relation to the ground, so that the earth engaging elements carried by the frame will either engage the earth in operative position or will be raised from the earth into inoperative position.

The earth engaging elements carried by the machine may be of any preferred or well known type arranged to produce any desired earth working operation, and in the present embodiment of the invention, I have illustrated the earth engaging elements as cultivators 10 depending from side bars 2.

The draft mechanism for the machine comprises spaced guide rails 11 having the bar 12 slidable between the same. At their forward end the guide rails may be connected by a cross plate 13 arranged beneath bar 12 in order to support the latter, and at its rear end this bar is preferably extended above and below the guide rails as shown at 14. Pins project through the extensions of bar 12, and rollers 15 are journaled thereon so as to engage the upper and lower surfaces of the guide rails. By this arrangement the bar 12 is readily slidable lengthwise of the guide rails 11.

The forward end of bar 12 is connected by any preferred draw bar connection 16 to suitable draft mechanism illustrated as a tractor 17. A flexible connection shown as a cable 18 is secured to the rear end of bar 12 as by eye bolt 19, and the opposite end of this cable is connected to a lever arm 20 fixed upon axle 5 as by the split clamp 21, so that as the lever is actuated, the axle will be turned for raising and lowering the frame of the machine relative to wheels 8 and to the ground.

The forward end of bar 12 is notched as shown at 22, and a retaining pin is mounted upon the machine frame for engagement with any one of the notches in order to hold the bar 12 in fixed relation to frame 1. As an instance of this arrangement brackets 23 extend upwardly from guide rails 11 adjacent the forward ends of the same, and a retaining pin 24 adapted to be received in any one of the notches 22 is journaled upon a pin 25 mounted in brackets 23. A lever arm 26 extends upwardly from the bearing for retaining pin 24 so that by pulling forwardly upon said lever arm, the retaining pin may be disengaged from notches 22, and a spring 26ª yieldably holds lever 26 in position to cause engagement of pin 24 with notches 22. A flexible connection 27 preferably extends from lever arm 26 to the driver's seat 28 of the tractor in order that the driver may readily disengage the retaining pin.

In practice the parts are so arranged that when rod 12 is fixed relative to frame 1 by the retaining pin 24 engaging a notch in said rod, lever 20 may be swung rearwardly, and when in such position the crank throws 6 are substantially parallel to the ground, and as a consequence the frame of the machine is lowered with relation to the ground. When now it is desired to raise the machine frame and thereby move the earth working elements into inoperative position, the operator pulls upon the flexible connection 27 so as to disengage retaining pin 24, and the draft upon bar 12 will thus move the latter forwardly relative to frame 1, and as a consequence lever 20 will be actuated through flexible connection 18 so as to rock axle 5 and thereby raise the machine frame relative to its wheels. The forward movement of bar 12 is limited by the engagement of the head 14 of said bar against pin 24, and when the parts have reached this position the continued draft upon bar 12 will move the machine forwardly with the earth engaging elements elevated to inoperative position.

When it is desired to again lower the frame, it is only necessary to back up the tractor 17 since as soon as the draft upon bar 12 is released, the weight of frame 1 will reversely rock axle 5 until the parts assume their original position with retaining pin 24 again engaging one of the notches 22. It will be understood that the frame of the machine may be adjusted in elevation with relation to the wheels and the ground by engaging pin 24 in a desired one of the notches 22.

Various changes may be made without departing from the spirit of the invention as claimed.

What is claimed is:

1. The combination in an earth working machine of a frame, earth engaging elements carried thereby, an axle journaled in said frame and having crank throws, wheels carried by said crank throws, a draw bar slidable relative to said frame, a lever extending from said axle, a connection between said draw bar and said lever for rocking the axle through the movement of the draw bar relative to the frame, and means operable from a point in advance of the machine for releasably locking the draw bar relative to the frame comprising a pawl pivoted and normally urged to engage the draw bar to lock the latter against sliding movement, means for urging the pawl into engagement with the draw bar, and flexible means extending to a point in advance of the machine and connected to said pawl to provide means for actuating the latter against said urging means.

2. An earth working machine comprising a frame, earth engaging elements carried by the frame, an axle journaled on the frame and having crank throws, wheels carried by the crank throws, rigidly sustained thereon, a draw bar slidable in the frame, an operative connection between said draw bar and said axle to effect oscillation of the axle upon reciprocation of the draw bar, and means operable from a point in advance of the machine for releasably locking the draw bar relative to the frame.

3. An earth working machine comprising a frame, guide rails secured to the frame, a draw bar slidable between the guide rails, rollers carried by the draw bar and engaging said rails, a U-shaped axle journaled in the frame, wheels on the ends of the axle, earth working elements carried by the frame, an arm secured to the axle, a connection between the arm and draw bar, and a latch member pivoted to engage or disengage the draw bar for securing the latter in different adjusted positions.

4. An earth working machine comprising a frame of triangular formation, brace bars within the frame, a U-shaped axle journaled on the brace bars, wheels carried by the ends of the axle, a pair of rails secured to and extending rearwardly from the forward corner of the frame, a draw bar slidable between the rails, a head formed on the inner end of the draw bar, rollers journaled on the head and engaging the upper and lower edges of said rails, said draw bar being formed at intervals with notches, an arm secured to the axle, a flexible connection between said arm and head, a pawl pivoted and urged to engage any one of said notches, and a flexible member connected to the pawl and adapted to extend forwardly from the machine to prevent actuation thereof to disengage the draw bar at a point in advance of the machine.

In testimony whereof I have signed my name to this specification.

JOSEPH S. REYNOLDS.